March 30, 1965  O. W. SMITH ETAL  3,175,715
CRANE AND TRAILER STRUCTURE
Filed July 30, 1962  5 Sheets-Sheet 1

INVENTOR.
OTHO W. SMITH and
BY  GEORGE K. SMITH

Lockwood, Woodard, Smith & Weikert
Attorneys

March 30, 1965 O. W. SMITH ETAL 3,175,715
CRANE AND TRAILER STRUCTURE
Filed July 30, 1962 5 Sheets-Sheet 2

INVENTOR.
OTHO W. SMITH and
BY GEORGE K. SMITH
Lockwood, Woodard, Smith & Weikart
Attorneys March 30, 1965  O. W. SMITH ETAL  3,175,715
CRANE AND TRAILER STRUCTURE
Filed July 30, 1962  5 Sheets-Sheet 3

INVENTOR.
OTHO W. SMITH and
BY GEORGE K. SMITH

Lockwood, Woodard, Smith & Weikart
Attorneys

March 30, 1965    O. W. SMITH ETAL    3,175,715
CRANE AND TRAILER STRUCTURE
Filed July 30, 1962    5 Sheets-Sheet 4
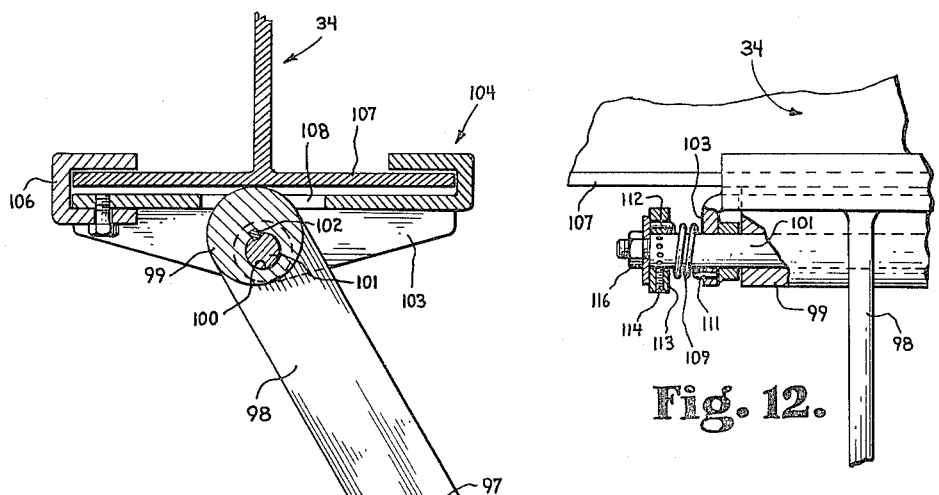
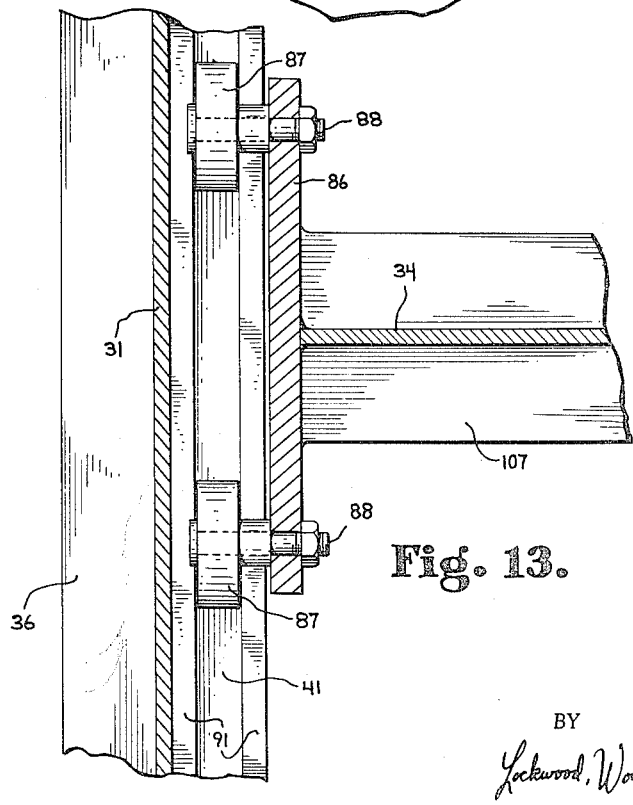
INVENTOR.
OTHO W. SMITH and
GEORGE K. SMITH
BY Lockwood, Woodard, Smith & Weikart
Attorneys March 30, 1965  O. W. SMITH ETAL  3,175,715
CRANE AND TRAILER STRUCTURE
Filed July 30, 1962  5 Sheets-Sheet 5

INVENTOR.
OTHO W. SMITH and
BY  GEORGE K. SMITH
Lockwood, Woodard, Smith & Weikart
Attorneys

United States Patent Office 3,175,715
Patented Mar. 30, 1965

3,175,715
CRANE AND TRAILER STRUCTURE
Otho W. Smith, 33 Oolitic Road, Bedford, Ind., and George K. Smith, 130 Candler St., Vacaville, Calif.
Filed July 30, 1962, Ser. No. 213,287
7 Claims. (Cl. 214—394)

This invention relates generally to trailers and semi-trailers intended for use with truck-tractors, and more particularly to a trailer capable of transporting automobiles and also other cargo of a character substantially different from automobiles.

It is well known that semi-trailers employed for carrying automobiles are single purpose units. The result of this is that when a load of automobiles has reached its destination, the utility of the trailer and the tractor pulling it has terminated until the combination has again reached the source of automobiles. This is because automobile trailers cannot satisfactorily be employed to carry any other type of cargo. It is apparent, therefore, that the return trip is not only a waste of wear and tear on the combination, but also a waste of both men and vehicle operating time.

It is, therefore, a general object of the present invention to provide an improved trailer.

It is a further object to provide a trailer capable of carrying automobiles or other vehicles and also capable of carrying cargo of a character substantially different from automobiles.

It is a further object to provide means for achieving the foregoing objects and having additional features facilitating the loading and unloading and protection of the cargo.

It is a still further object to provide means for achieving the foregoing objects and readily adjusted in length to conform to legal requirements in various states.

Described briefly, a typical embodiment of the present invention incorporates first and second upright frames and a horizontal frame including two long side members bridging the tops of the upright frames. The first upright frame has means removably secured to the bottom thereof for connection to the fifth wheel of a truck-tractor. The second frame has a road-wheel unit removably connected to the underside thereof whereby the combination of frames comprises a semi-trailer.

The upright frames are readily adjustable lengthwise with respect to the horizontal frame and are provided with hydraulic jacks for support thereof when the fifth wheel connecting means and the road wheel unit are removed.

Crossmembers are provided on the horizontal frame which can be moved lengthwise thereof. Electric chain hoists are mounted to the crossmembers whereby the load can be hoisted to a carrying position from a location on the ground immediately under the trailer.

The full nature of the invention will be understood from the accompanying drawings and the following description and claims:

FIG. 11 is a section along the line 11—11 of FIG. 10 showing details of movable hoist mounts with cam action to lock in position when a load is applied to the hoist.

FIG. 12 is a fragmentary right side elevation of FIG. 11 showing spring means for compensating for the weight of a hoist so that the mount is free to move along the girder unless weight in addition to hoist is exerted on lever arm.

FIG. 13 is a section along line 13—13 of FIG. 10 presenting a top view of the wheel mounting for movable cross members.

Figure 1:
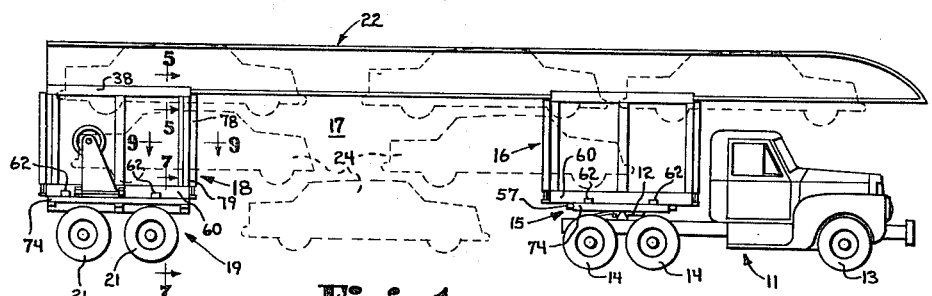
FIG. 1 is a side elevation of a typical embodiment of the trailer and a tractor in one of its running conditions.

Referring to the drawings a tractor truck 11 having the fifth wheel 12 is provided with the usual road wheels including the front wheels 13 and a tandem set of dual rear wheels 14. The fifth wheel 12 supports a king pin unit 15 removably secured to and supporting the forward upright frame 16 of the trailer 17. The trailer has a rear upright frame 18 supported by a road wheel unit 19 including the road wheels 21. The road wheel unit 19 may be a simple framework with a conventional assembly of springs, axles, and shock absorbers. A horizontal frame 22 bridges the upright frames 16 and 18 at the top margins thereof. Automobiles 24 are shown as typically carried by the trailer.

Figure 2:
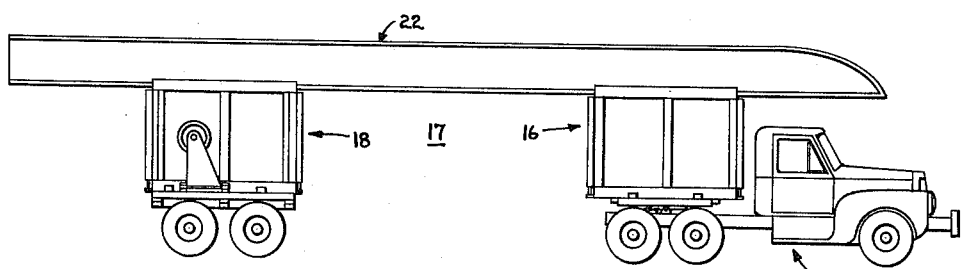
FIG. 2 is a side elevation of the typical embodiment of the trailer and a tractor illustrating the longitudinally adjustable nature of the vertical frames.

FIG. 2 illustrates a feature of the present invention whereby the front and rear upright frames are both moved forward with respect to the horizontal frame 22. This illustrates one of many possible relative positions between the front and rear upright frames and the horizontal frame.

Figure 3:
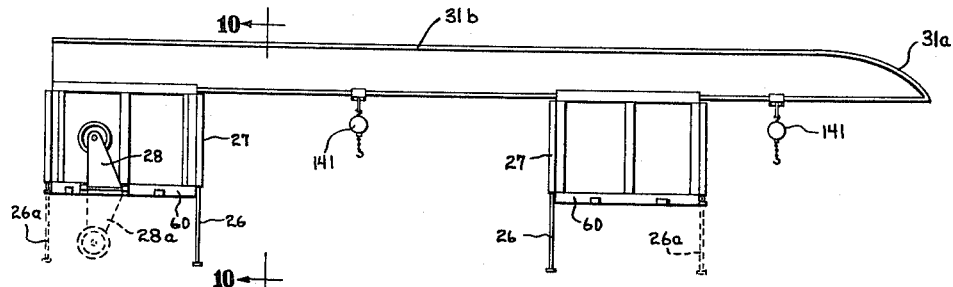
FIG. 3 is a side elevation illustrating a condition wherein the rear wheel assembly and tractor are detached from the trailer.

FIG. 3 illustrates a further feature of this invention wherein the posts 26 of hydraulic jack units 27 are extended to support both the front and rear upright frames, the tractor having been driven out from under the front frame, the king pin unit 15 and the road wheel unit 19 having been removed from the front and rear upright frames respectively. This feature permits loading the trailer simultaneously from both the front and rear ends which is particularly advantageous in loading of automobiles where they can be easily driven into position for loading.

FIG. 3 also shows the auxiliary wheel units 28 in their usually stored condition and in the lowered condition designated by the dotted outline 28a. Additional jack posts 26a are shown by dotted outlines and it is usually desirable that these be extended as shown during the loading and unloading operation.

Figure 4:
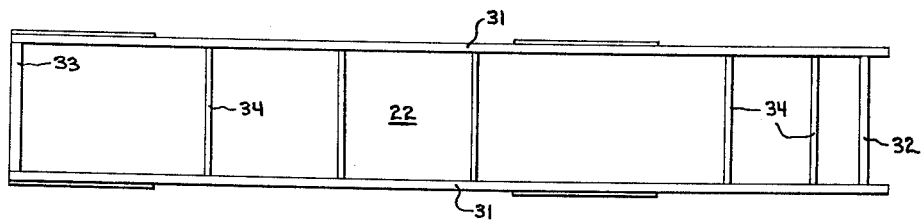
FIG. 4 is a top view of the trailer as shown in FIG. 3.

In FIG. 4, the general character of the longitudinal frame 22 can be better appreciated. In addition to the longitudinal girders 31 providing the side members of the frame there is a front crossmember 32 affixed to the forward ends of girders 31 and a rear crossmember 33 affixed to the rear ends of the girders. Crossmembers 34 are mounted to the girders to facilitate movement lengthwise with respect to the girders in a manner which will become apparent as the decription proceeds.

Figure 5:
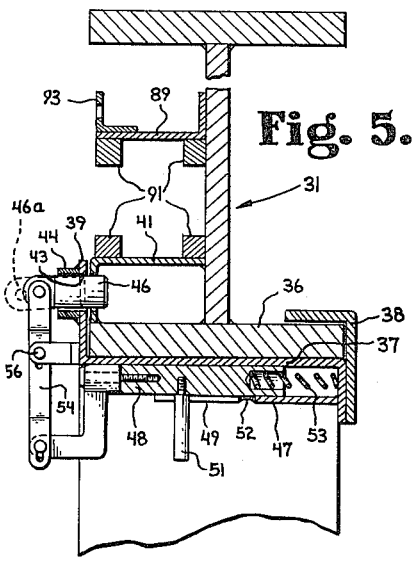
FIG. 5 is a section taken along the line 5—5 of FIG. 1 showing details of retaining and locking mechanism for positioning both upright frames relative to top girder assembly.
Figure 6:
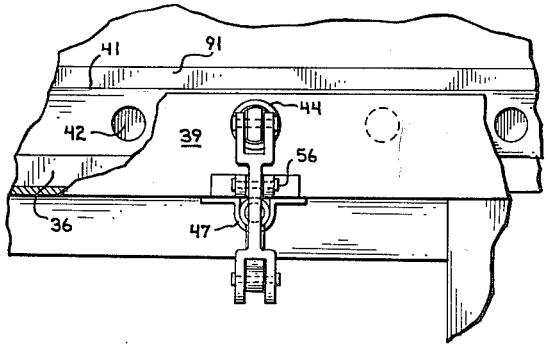
FIG. 6 is a side elevation of the mechanism of FIG. 5 viewed from the left side of FIG. 5.

FIG. 5 is the section taken along the line 5—5 of FIG. 1, and FIG. 6 is an enlarged fragmentary illustration showing additional details of parts shown in FIG. 5. The girder 31 is an I-section having the lower plate portions 36 supported by the Z-shaped member 37 of the rear upright frame 18 of FIG. 1. The angle section 38 serves, together with the inner flange 39 of the member 37, to align the upright frame 18 with the horizontal frame 22. Thus the upright frame 18 is keyed to the longitudinal frame 22.

An angle section 41 is welded to the inside surface of the girder 31 as shown and is provided with a plurality of apertures 42 therealong. The flange 39 also has an aperture 43 therein. The aperture 43, together with the boss 44 aligned therewith, retains and aligns the lock pin 46 with respect to the member 37. The lock pin 46 is, of course, receivable in any one of the plurality of apertures 42 whereby the upright frame 18 can be locked into any one of a number of positions longitudinally of the horizontal frame 22.

To facilitate operation of the lock pin 46, a slider box is secured to the underside of the member 37 and receives the slider 48. A slot 49 in the slider box accommodates the slider handle 51 and a notch 52 at the outside end of the slot 49 receives and retains the handle 51 upon rotation of the slider in the box to hold the slider against its return spring 53. Thus it is seen that the pin 46, which is connected to the slider 48 by the link 54 pivoted at 56 to the member 37, can be held in the position designated by the dotted outline 46a to accommodate adjustment of the upright frame longitudinally of the horizontal frame. It should be understood, of course, that several lock pin assemblies may be provided on each side of each of the upright frames for the strength desired. Connection of both of the upright frames to the horizontal frame may be understood to be as illustrated in FIGS. 5 and 6.

Figure 7:
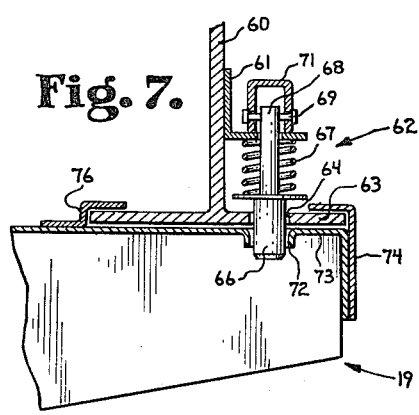
FIG. 7 is a section taken along line 7—7 of FIG. 1 showing details of the retaining and locking mechanism for attaching trailer wheels to the rear upright frame.
Figure 8:
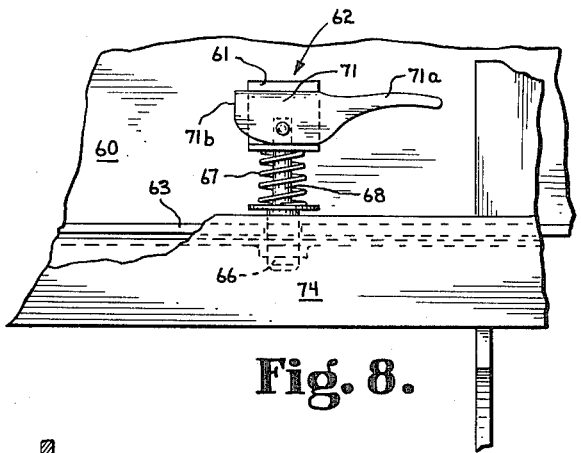
FIG. 8 is a side elevation of FIG. 7 viewed from the right side of FIG. 7.

FIGS. 7 and 8 illustrate details of the attachment of the road wheel unit 19 to the rear upright frame. They may also be understood to apply to the attachment of the fifth wheel connecting king pin unit 15 to the front upright frame 16. The lower side member 60 of the upright frames is an I-section and has mounted to the web thereof a bracket 61 for the latch assembly 62. It also has in the lower plate 63 thereof an aperture 64 receiving the lock pin 66. The lock pin is biased downwardly by the spring 67 and the stem 68 of the pin is retained by the pin 69 in the handle unit 71.

The pin 66 is shown engaged in the aperture 72 in the upper plate 73 of the road wheel unit 19. In the king pin unit 15 the part corresponding to plate 73 may be the upper fifth wheel plate 57. An angle section 74 is secured to the plate 73 and also a Z-section 76 is secured to the plate 73. The angle section 74 and Z-section 76 cooperate to align the road wheel unit 19 with the rear upright frame thus keying them together. The pin 66 retains the road wheel unit and lower frame side member 60 in fixed relative longitudinal positions until the pin is raised by raising the handle 71a of the handle unit to the position where the flat end 71b supports the pin 66 out of possible engagement with the plate 73 or aperture 72 therein. This is the manner in which the road wheel unit is secured to the upright frame and this may also be understood to be the manner in which the fifth wheel connecting unit 15 of the front upright frame is connected thereto.

Figure 9:
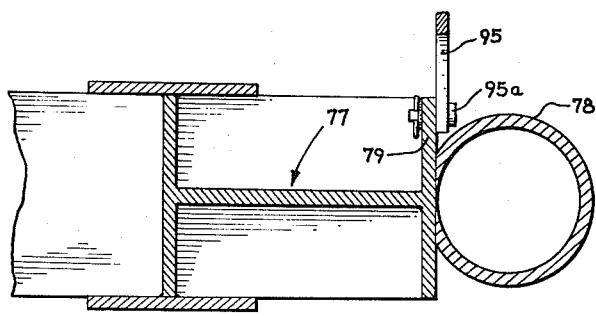
FIG. 9 is a section taken along line 9—9 of FIG. 1 showing structure of vertical members of the upright frame with the tubular housing for hydraulic lifts, typical of all four corners of each of the two upright frames.

FIG. 9, which is a section taken along the line 9—9 of FIG. 1, illustrates the frame structure provision for the jack unit 27. The corner posts 77 of the upright frames are a combination of I and H sections. The jack unit cylinder 78 is welded to the outside face of the front flange 79 of the corner post 77. It will be understood, of course, that the rear corner posts can be of the same construction and where the flange 79 was referred to as the front flange for the front corner posts, it may, of course, be considered the rear flange of the rear corner posts. The interior details of the jack units may be conventional and, therefore, illustration thereof is unnecessary. The front upright frames may be understood to have the same type of structural details.

Figure 10:
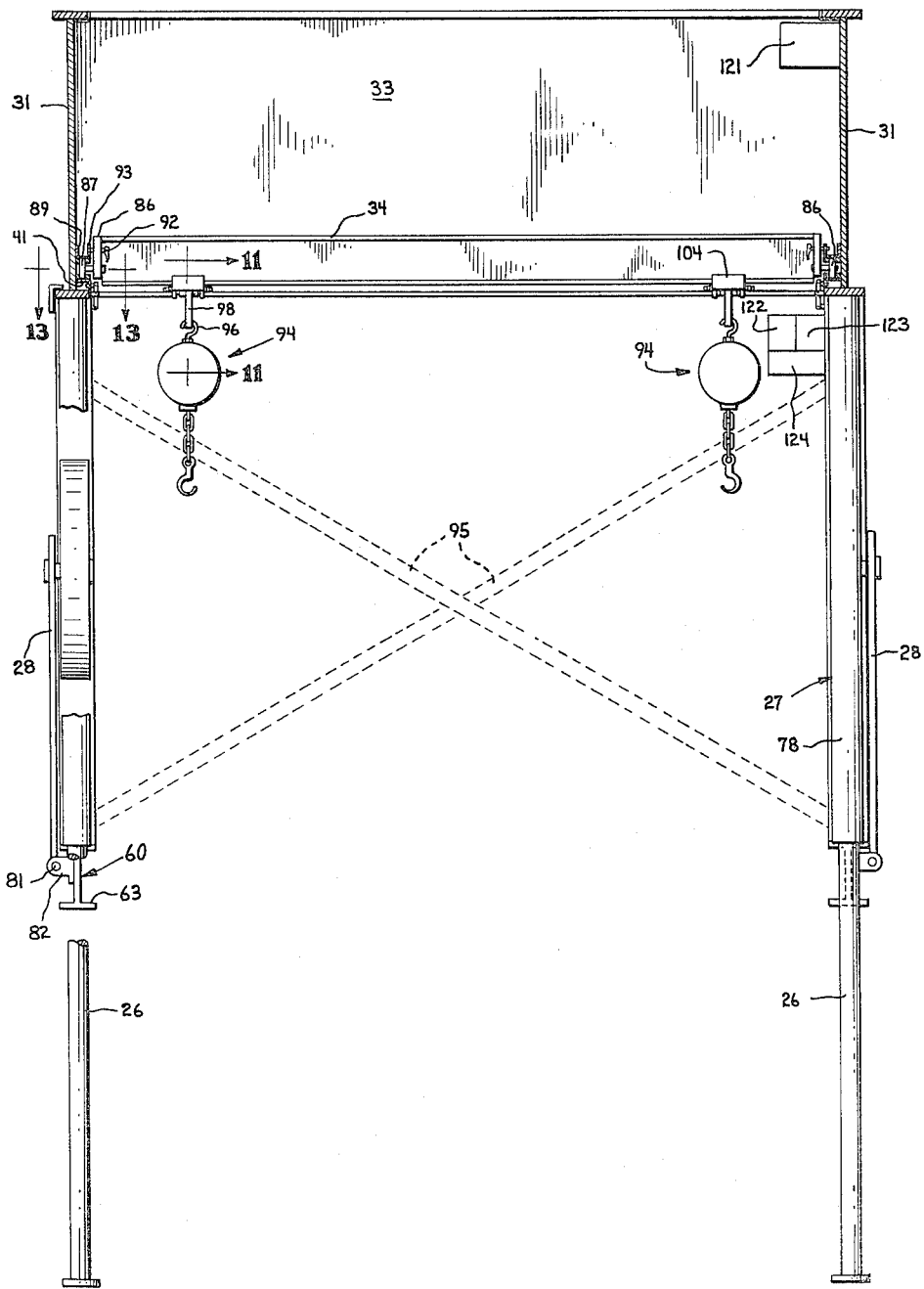
FIG. 10 is an enlarged section along the line 10—10 of FIG. 3 illustrating movable crossmembers and unrestricted loading area through rear of trailer, and also illustrating pivotal wheels which may be used for movement of the trailer after the regular road wheel assembly has been removed.

Referring to FIG. 10, which is a section taken along the line 10—10 of FIG. 3, the unobstructed access to the trailer can be readily appreciated. With the jack posts 26 extended and the road wheel unit 19 removed, the space between the vertical downward projection of the girders 31 is completely unobstructed from the ground up through the top of the longitudinal frame, the crossmembers 34 being, of course, free to move longitudinally. Thus an automobile may be driven completely through the area beneath the trailer.

Likewise, other cargo, such as lumber, rolling mill stock, and crates, for example, can be easily located below any portion of the trailer. Also, it will be noted that the auxiliary wheel units 28 are pivotally mounted by the pins 81 to the brackets 82 which are in turn welded to the lower side members 60 of the upright frame 18. These wheel units may, therefore, be pivoted to the position shown in FIG. 3, whereupon the trailer can be backed into position over a cargo by the tractor supporting the front upright frame. This could also be accomplished by using a form lift to support the front upright frame and move the trailer into position over a cargo. Of course, for this purpose the jack posts 26 could not be extended their full distance.

FIG. 10 also shows additional details of the cross members 34 and their mounting to the girders 31. Each of the crossmembers 34 is an I-section having a plate 86 welded to the end thereof. This may be more clearly seen in FIG. 13. Front and rear roller wheels 87 are mounted on the axles 88 secured to the plates 86. These wheels are free to ride along the angle section 41 which is shown in more detail in FIGS. 5 and 6. The angle section 89 is secured to the girders 31 providing a vertical limit for the roller wheels. Upper and lower guide strips 91 are secured to the angle sections 41 and 89 to provide lateral confinement for the roller wheels 87. Thus, it is seen that the cross members 34 can be moved to any location lengthwise with respect to the horizontal frame. They can be secured in any position lengthwise by the lock pin assembly 92 identical to assembly 62 used to secure the road wheel unit 19 to the rear upright frame 18 and shown in detail in FIGS. 7 and 8. An apertured strip or angle section 93 (FIGS. 5, 10) can be secured to the section 89 to provide the plurality of locations where the crossmembers may be locked.

The dotted outlines 95 in FIG. 10 designate cross-bracing removable tie bars in their location when the trailer is being hauled. The tie bars may be conveniently fastened, as by pins 95a (FIG. 9), to the flanges 79 of upright corner posts 77 of the trailer.

Electric chain hoists 94 are mounted to the crossmembers 34 and may be freely positionable laterally of the trailer so long as they are not loaded. Mounted details are shown in FIGS. 11 and 12.

Referring to FIGS. 11 and 12 along with FIG. 10, the upper hook 96 of chain hoist 94 is received in the aperture 97 in the distal end of the support arm 98. The support arm 98 is secured to the cam cylinder 99 which is cylindrical but is mounted by means of an offset aperture 100 to the shaft 101. A suitable key 102 prevents relative rotation between the cam cylinder 99 and the shaft 101. The shaft 101 is supported in the downturned flanges 103 of the bracket 104. The bracket 104 has a generally C-shaped section with a channel section 106 secured along the rear edge thereof to support the bracket on the lower plate 107 of the cross member 34.

To avoid the aforementioned clamping action as the result of merely the weight of the chain hoist itself, a spring 109 has one end thereof in an aperture 111 in the flange 103 and the other end thereof received in the aperture 112 in the block 113 secured to the shaft 101 by the set screw 114. Various depressions 116 around the shaft facilitate gripping of the shaft by the set screw in various locations around the shaft and, therefore, the spring can be wound to whatever extent is necessary to balance the weight of the hoist itself. Therefore, clamping of the brackets 104 to the crossmembers is avoided until the hoists are loaded.

It should be understood, of course, that the hoists may be electric or otherwise powered and need not be chain hoists specifically. It should also be understood that the trailer is intended to carry its own power source for operation of the jacks as the hoists. For example, an electric supply unit 121 may be conveniently mounted in the upper corners of the horizontal frame as indicated in FIG. 10. Also, where the jacks are hydraulic, a motor-pump 122, reservoir 123, and control valve assembly 124 may be mounted in the upper corner of each of the upright frames.

It will be observed in FIGS. 1 through 3, that the upper edge of the forward end of the girders 31 is downturned at 31a. This feature is of particular advantage when the vehicle is used in hauling automobiles. The roof-lines of all the automobiles can be below the level of the top horizontal portion 31b of the girders and thus the possibility of damage to the automobiles from striking low hanging tree limbs or even road or railroad overpasses is eliminated. Also, the whole frame can be covered by a single tarpaulin to protect all of the cars, thus precluding the need for individual tarpaulins and the time required to secure them. Horizontal swaying of the cargo can be readily precluded by suitable guying wires or chains.

Figure 16:
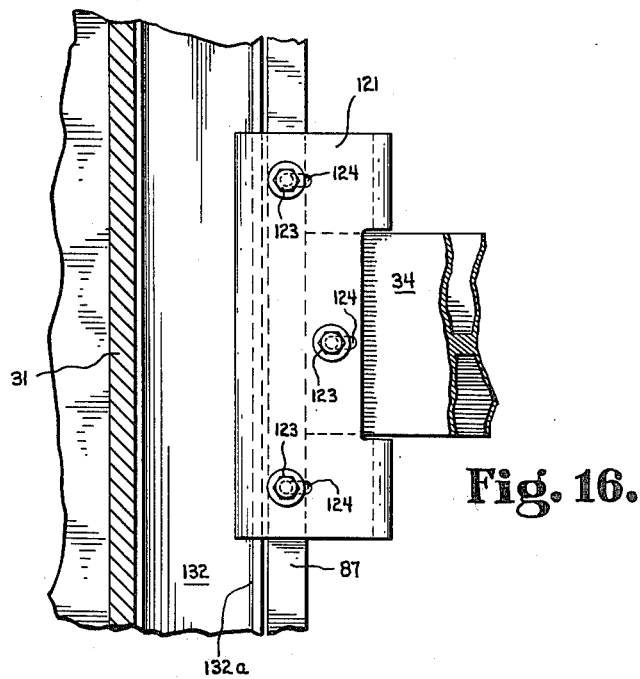
FIG. 16 is an enlarged fragmentary section taken along line 16—16 in FIG. 14 and viewed in the direction of the arrows.

It will be understood further that variations may readily be made in specific details within the general scope of the invention. For example, referring to FIGS. 14 through 16, there is shown a variation of means for locating and holding the cross members 34 in various positions lengthwise of the trailer frame. The parts which are the same as shown in previous figures are identified by the same reference numerals. A clamping plate 121 having a cross section of channel shape, is secured by means of the bolts 123 to the cross member proper 34. These bolts may be understood to be shoulder bolts so that the clamp 121 is not tightly attached to the cross member. By the provision of apertures 124 in the clamp, some freedom of movement in a direction transverse of the trailer is possible.

An operating cam assembly 126 is pivotally mounted by means of the brackets 127 to the plates 86 welded to the ends of the cross member 34. The assembly 126 includes a cam 128 secured to the generally parallel arms 129 of the handle, which arms are joined by a bight portion 131. It will be observed, therefore, that when the handle assembly is moved to the position shown in FIGS. 14 and 15, the clamp 121 is pulled tightly against the wall 132a of the member 132.

Figures 14, 15:
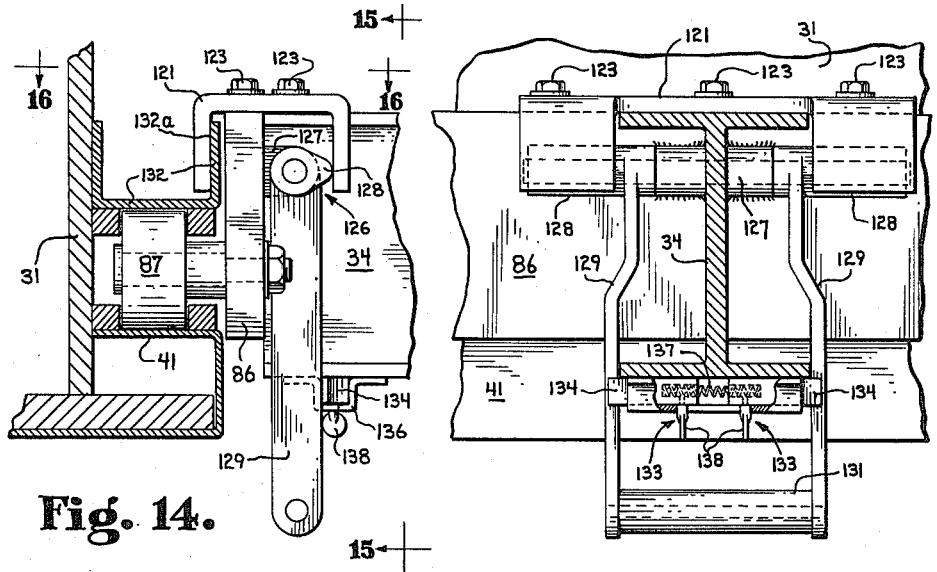
FIG. 14 is an enlarged fragmentary cross section showing an alternative means of locking the cross members 34 in various locations lengthwise of the trailer.
FIG. 15 is an enlarged fragmentary section taken along line 15—15 of FIG. 14 viewed in the direction of the arrows.

In order to lock the handle arms 129 in the position shown in FIG. 14, latches 133 are provided. Each of these latches includes a latching bar 134 slidably mounted in a guide 136. The pair of latching bars shown in FIG. 15 is provided with a single spring 137 biasing the bars apart in a handle locking manner. To release the handle assembly 126, it is necessary only to move toward each other the two latch bar handles 138, an operation which can easily be performed with two fingers.

With a cam fastening means as just described provided at each end of each of the cross members 34, it is possible to secure the cross members in any desired location lengthwise of the trailer.

Another item which may be noted is the provision of hoists 141 at various locations along the girder 31. These hoists may be mounted to the girder 31 at each side of the trailer frame in the same manner as the hoists are mounted to the cross members 34, and therefore, are freely positionable lengthwise of the trailer so long as they are not loaded. Possible positions of two such hoists on girder 31 are indicated by way of example in FIG. 3.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In combination:
    a truck tractor having an operator's cab and a fifth wheel;
    a first upright frame mounted on said fifth wheel;
    a second upright frame in horizontal spaced relation to said first frame and behind said first frame, and having supporting wheels thereunder;
    and an elongate member bridging said frame and having at least a portion at an elevation higher than the top of the tractor cab and extending over a portion of said tractor in front of said operator's cab, said extending portion having roller receiving tracks thereon;
    and crossmembers having hoists connected thereto and movable thereon, said crossmembers having rollers thereon received in said tracks whereby said hoists are movable to positions over said tractor portion in front of said cab for suspending cargo over said cab.

2. In a trailer having longitudinal girders in horizontal spaced relation, with crossmembers extending between and supported by said girders, means for supporting hoists on said crossmembers and comprising:
    a bracket having portions bearing downwardly on an upper surface of said crossmember;
    a shaft supported below said crossmember by said bracket;
    a cam affixed to said shaft and engageable with a lower surface of said crossmember by rotation of said shaft;
    and a lever arm secured to said cam, said arm having a portion connected to a hoist, said portion being located to respond to a downwardly directed vertical load applied to said hoist to engage said cam to said lower surface and clamp said bracket to said crossmember; and a spring connected to said bracket and said shaft and normally resiliently supporting said hoist and disengaging said cam from said lower surface until an external downwardly directed load is applied to said hoist.

3. A trailer comprising:
    a rectangular longitudinal frame having first and second side members in horizontally spaced relation;
    a pair of front vertical support members and a pair of rear vertical support members disposed in horizontally spaced relation, each of said support members being directly below one of said frame side members and supporting said frame;
    said support members including retractable portions for lowering said frame;
    means supported by said frame for hoisting a plurality of individual loads from the ground to carrying positions in said trailer;
    a fifth wheel connector unit movably attached across said front support members after loading said trailer, said trailer being devoid of members permanently affixed across the space between said front support members;
    a road wheel unit removably attached across said rear support members after loading said trailer, said trailer being devoid of members permanently affixed across the space between said rear support members; and instantly operable lever operated lock means connecting said units to said support members and selectively operable to quickly unlock said units from said support members when desired, the said retractable portions being retractable after loading said trailer to accommodate support of said trailer by said road wheel unit and by a fifth wheel of a truck.

4. A trailer comprising:
a longitudinal frame having side members in horizontally spaced relation;
front and rear vertical support means connected to said frame side members and disposed in horizontally spaced relation below said frame side members and supporting said frame, said rear support means including a first vertical support member below one of said side members and a second vertical support member below the other of said side members, said first and second members being in parallel horizontally spaced relation;
a fifth wheel connector unit secured to a portion of said front support means for normal support thereof by the fifth wheel of a truck;
a road wheel unit secured across said first and second vertical support members for additional normal support of the trailer for hauling by the truck;
one of said units being removable to provide a completely unobstructed space from the ground surface up between the vertical support means normally supported by said one unit, said normally supported vertical support means including jack members extendable to support said means to facilitate removal of said one unit; and instantly operable quick release means normally locking said one unit to said normally supported vertical support means to facilitate removal of said one unit.

5. A tractor-trailer combination comprising:
a truck tractor having an operator's cab and a fifth wheel behind the cab;
a trailer having a rectangular longitudinal frame having first and second longitudinal frame side members in horizontally spaced relation, portions of said side members extending over a portion of said tractor in front of said cab and having roller receiving tracks thereon;
a first rear vertical support frame disposed directly under said first side member;
a second rear vertical support frame disposed directly under said second side member, said first and second vertical support frames being disposed in parallel horizontally spaced relationship with a space therebetween of adequate width to permit entry and exit therebetween of the units of cargo to be carried by said trailer;
a third vertical support frame disposed directly under said first side member and in front of said first vertical support frame;
a fourth vertical support frame disposed directly under said second side member and in front of said second vertical support frame, said third and fourth vertical support frames being disposed in parallel horizontally spaced relationship and having a passage therebetween of adequate width to permit passage therebetween of units of cargo to be carried by the trailer, all of said support frames being longitudinally adjustable on said side members and having instantly manually operable lever-operated bolt means thereon engaging locking means in said side members to secure said support frames to said side members in selected positions therealong;
a vertically extensible and retractable member mounted to each of said vertical support frames and providing for the raising and lowering of said support frames and thereby said longitudinal frame;
hoisting means having rollers connected thereto supported by said longitudinal frame and movable along said tracks longitudinally and movable transversely, said hoisting means being movable from points adjacent the front of said frame side members to points adjacent the rear of said frame side members for hoisting a plurality of individual cargo units from the ground to carrying positions in said trailer at any point along the length of the trailer;
a fifth wheel connector unit connected across the lower ends of said third and fourth vertical support frames and attachable to the fifth wheel of a tractor vehicle;
and a road wheel unit incorporating conventional springs and axles and connected across the lower ends of said first and second vertical support frames;
said connector unit including members extending across the horizontal space between said third and fourth vertical support frames and being removable therefrom to accommodate entrance and exit of individual cargo units between said third and fourth vertical support frames from the front end of the trailer in a direction parallel to said side members;
and said road wheel unit including members extending across the horizontal space between said first and second vertical support frames and being removable therefrom to accommodate entrance and exit of individual cargo units between said first and second vertical support frames from the rear end of the trailer in a direction parallel to said side members;
said retractable and extensible members being extensible to support said vertical support frames and thereby said longitudinal frame when said connector unit and said road wheel unit are removed to accommodate loading and unloading of said trailer from the front and rear ends thereof, and said extensible and retractable support members being retractable after replacement of said road wheel unit and fifth wheel connector unit on the lower ends of said vertical support frames to permit support of said trailer by said road wheel unit and said fifth wheel connector unit;
instantly manually operable lever operated bolts on said vertical support frames and normally locking said road wheel unit and said connector unit to said support frames, said levers being selectively operable to unlock and lock said wheel and connector units on said support frames to facilitate removal and attachment thereof;
and a pair of auxiliary wheels, each wheel being mounted to a leg normally folded into one of said first and second side frames, each leg being swingable downwardly to a position directly below the side frame to which it is mounted for thereby rollingly supporting the rear portion of said longitudinal frame when desired.

6. A trailer comprising:
a rectangular longitudinal frame having first and second longitudinal frame side members in horizontally spaced relation;
a first rear vertical support frame disposed directly under said first side member;
a second rear vertical support frame disposed directly under said second side member, said first and second vertical support frames being disposed in parallel horizontally spaced relationship with a space therebetween of adequate width to permit entry and exit therebetween of the units of cargo to be carried by said trailer;
a third vertical support frame disposed directly under said first side member and in front of said first vertical support frame;
a fourth vertical support frame disposed directly under said second side member and in front of said second vertical support frame, said third and fourth vertical support frames being disposed in parallel horizontally spaced relationship and having a space therebetween of adequate width to permit passage therebetween of units of cargo to be carried by the trailer;

hoisting means supported by said longitudinal frame and movable therealong longitudinally and transversely for hoisting a plurality of individual cargo units from the ground to carrying positions in said trailer;

a fifth wheel connector unit connected across the lower ends of said third and fourth vertical support frames and attachable to the fifth wheel of a tractor vehicle;

and a road wheel unit connected across the lower ends of said first and second vertical support frames;

instantly operable locking means on said support frames normally locking said road wheel unit and said connector unit thereto, said locking means being instantly and selectively releasable whereby said connector unit and said road wheel unit are removable from said support frames to accommodate entrance and exit of individual cargo units between said vertical support frames from the front and rear end of the trailer in a direction parallel to said side members.

7. The trailer of claim 6 wherein said third and fourth support frames are selectively positionable lengthwise of said longitudinal frame.

References Cited by the Examiner
UNITED STATES PATENTS

| | | | |
|---|---|---|---|
| 2,376,296 | 5/45 | Walter | 214—394 |
| 2,540,803 | 2/51 | Alexander et al. | 214—394 |
| 2,751,234 | 6/56 | Couse | 214—515 X |
| 2,756,073 | 7/56 | Bridge | 214—515 X |
| 2,820,557 | 1/58 | Emanuel | 214—394 |
| 2,913,132 | 11/59 | Cluck et al. | 214—394 |
| 2,961,269 | 11/60 | Renfroe | 294—85 |

FOREIGN PATENTS

| | | |
|---|---|---|
| 477,423 | 12/37 | Great Britain. |
| 792,685 | 4/58 | Great Britain. |

HUGO O. SCHULZ, *Primary Examiner.*

GERALD M. FORLENZA, *Examiner.*